United States Patent [19]

Torigoe et al.

[11] Patent Number: 5,242,646
[45] Date of Patent: Sep. 7, 1993

[54] METHOD OF MAKING AN INTERENGAGING FASTENER MEMBER

[75] Inventors: Shinji Torigoe, Sagamihara; Jiro Hattori, Atsugi; Akimitsu Takagi, Sagamihara, all of Japan

[73] Assignee: Minnesota Mining and Manufacturing Company, St. Paul, Minn.

[21] Appl. No.: 880,052

[22] Filed: May 7, 1992

[51] Int. Cl.$^5$ .............................. B29C 45/32
[52] U.S. Cl. ......................... 264/219; 249/61; 264/23; 264/69; 264/221; 264/317; 264/318; 425/DIG. 12
[58] Field of Search .......... 264/313, 317, 297.2, 264/328.8, 318, 167, 166, 221, 23, 69, 71, 219; 425/DIG. 12; 249/61

[56] References Cited

U.S. PATENT DOCUMENTS

| | | | |
|---|---|---|---|
| 3,961,014 | 6/1976 | Pasch et al. | 264/313 |
| 4,069,290 | 1/1978 | Pasch | 264/313 |
| 4,440,392 | 4/1984 | Popplewell | 264/317 |
| 4,889,666 | 12/1989 | Kawasaki | 264/317 |
| 5,143,665 | 9/1992 | Clubbs et al. | 264/317 |

*Primary Examiner*—Jan H. Silbaugh
*Assistant Examiner*—Brian J. Eastley
*Attorney, Agent, or Firm*—Gary L. Griswold; Walter N. Kirn; Peter L. Olson

[57] ABSTRACT

A method of forming a fastener member having a base and a plurality of headed stems arranged in columns and rows and projecting from the base. The fastener member is formed by injection molding a molten material into a base mold, sacrificial stem mold and head mold, wherein the material is solidified. After the base mold and head mold are removed, the stem mold may be destructively removed to release the fastener member.

8 Claims, 5 Drawing Sheets

METHOD OF MAKING AN INTERENGAGING FASTENER MEMBER

TECHNICAL FIELD

This invention relates to fasteners and specifically to fasteners of the type having two opposed fastener members each including a surface having a plurality of arranged headed stems projecting therefrom.

BACKGROUND OF THE INVENTION

Mating fasteners that include two opposed fastener members are popular in a variety of applications. The particular type of mating fastener with which the present invention is concerned includes two opposed fastener members, each including a surface having a plurality of arranged headed stems projecting therefrom. Such fasteners are particularly useful in an environment where it is desirable to interengage the fastener using a relatively small amount of force, while requiring a larger force to separate the fastener members.

Figure 1:
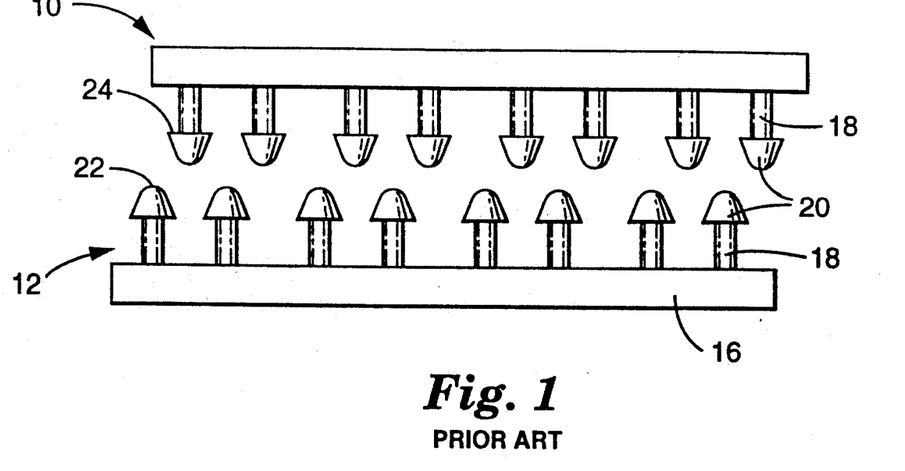
FIG. 1 is a sectional view of a representative fastener of the prior art prior to interengagement of the fastener members.
Figure 2:
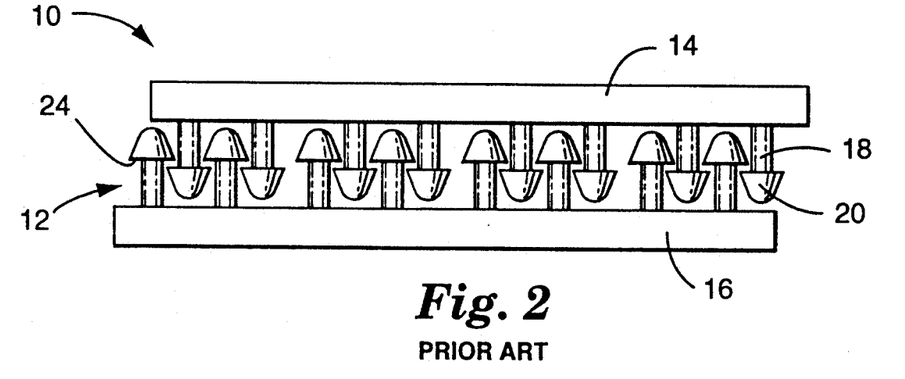
FIG. 2 is a sectional view of a representative fastener of the prior art following interengagement of the fastener members.

A conventional molded polymeric fastener is shown in FIG. 1. Included are opposed fastener members 10 and 12, including bases 14 and 16, respectively. Each base includes a plurality of arranged stems 18 orthogonally projecting therefrom, and each terminating in a head 20 at the respective distal ends of stems 18. The heads have generally arcuate surfaces 22 opposite the respective bases 14 and 16, which surfaces are adapted for sliding contact with the encountered arcuate surfaces 22 of heads 20 when the fastener members are first brought together. Heads 20 also each include a generally planar latching surface 24 extending radially outwardly of the stem, which is adapted to engage a latching surface of an opposed head, as shown in FIG. 2.

FIG. 1 shows fastener members 10 and 12 prepared for engagement, with the heads of one fastener member positioned generally between the heads of the other fastener member. To engage the fastener, fastener members 10 and 12 are urged toward each other with the respective bases generally parallel, causing heads 20 to contact and to deflect the attached stems laterally. The lateral deflection of the stems allows the heads of one fastener member to pass the heads of the opposed fastener member to engage the fastener members in the manner illustrated in FIG. 2.

In the past, fasteners of the type discussed above were generally formed by passing a backing layer having a multiplicity of projecting stems beneath a heat source, which heat source tends to melt the stems to form heads atop each of the stems. Such a process is known in the art, as illustrated by U.S. Pat. No. 4,290,832 (Kalleberg), entitled "Method for Making Fasteners." The '832 patent discloses a multi-step process for producing a fastener member having a backing layer, a plurality of monofilament stems projecting normally from the backing layer, and a head atop each stem.

Figure 3:
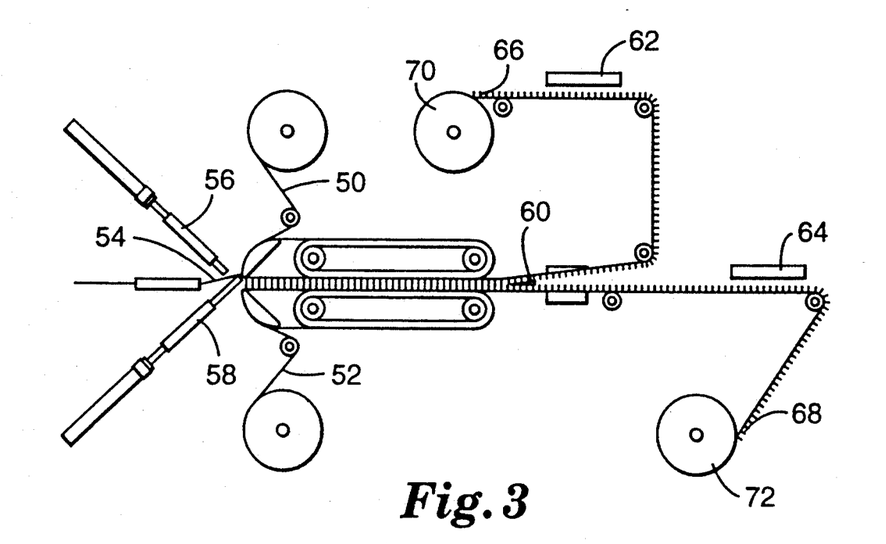
FIG. 3 is a schematic representation of a process of the prior art for providing heads to a plurality of monofilament stems projecting from a base layer.

The process, illustrated schematically in FIG. 3, includes moving two backing layers 50 and 52 in parallel paths while feeding monofilament 54 between the layers, and pressing the monofilaments using applicators 56 and 58, so that the monofilaments extend normally between the layers. The monofilaments are severed halfway between the backing layers by blade 60, which produces dual, opposed backing layers each having a plurality of monofilaments extending from each backing. The newly severed terminal ends of the monofilaments are then heated by heat sources 62 and 64 to a temperature sufficient to form a head atop each of the stems. After the heads have solidified, the two fastener members 66 and 68 are wound onto separate rollers 70 and 72, respectively, for dispensation and use.

While having their own utility, the fasteners formed by the process described above tend to exhibit inconsistently shaped heads, which can potentially affect release performance. For example, a generally spherical head having an arcuate latching surface may be unintentionally formed by such a process. An arcuate latching surface tends to disengage more easily than a planar latching surface extending radially from the stem, and could lower the force required to disengage the fastener. Alternatively, the heads could be irregularly formed due to the inconsistent application of heat, differences in production speed, and the like. Such irregularities could prompt inconsistent release characteristics, which may be undesirable under some circumstances.

Furthermore, for certain applications it may be preferable to provide heads that are generally conical, spherical, or some other such desired shape in order to obtain certain engagement and release characteristics. For example, U.S. Pat. No. 4,454,183 (Wollman) discloses a three lobed head structure formed by the application of heat to a triangular monofilament stem. However, as discussed above, heads formed by the application of heat to a monofilament stem tend not to be consistently formed. Furthermore, the number of different head structures is generally limited by the size and shape of the stems from which they are formed.

Another approach to forming heads atop stems in a desired shape is disclosed in Japanese patent publication no. 1-238805 (Anzai). The method disclosed in the '805 publication involves forming individual rows of stems by injection molding. Each individual row of stems, which stems may include spherical, conical, or other shaped heads, is typically formed in a mold that is split along the longitudinal axis of the stem. After the molten material has been injected and solidified, the halves of the mold may be separated, and the individual row of stems removed.

In order to form a fastener from the individual rows of stems, several such rows must be aligned and connected together. The individual rows may be connected by means of adhesive, thermal bonding, high frequency bonding, and the like. Although this method of forming a fastener may represent an improvement over the prior art in terms of head formation, it involves a greater investment of time and equipment to connect the individual rows together to form the fastener, and is therefore more expensive and undesirable.

Finally, it is often desirable to form a secondary fastening portion on one surface of the fastener, typically the back surface, in order to enable the fastener to be easily attached to a surface, body, or the like. At present, the secondary fastening portion is typically attached to the back of the fastener member by welding (either solvent, heat, or ultrasonic welding), which requires a manufacturing step separate from the formation of the fastener portion. The second manufacturing step increases the cost of the article, and is therefore undesirable.

It is therefore desirable to provide a method of making a unitary fastener member having rows and columns of stems having consistently identical head structures of a desired shape, to provide a method of making a unitary fastener having head structures of different desired shapes, and to provide a fastener member having an integral secondary fastening portion that is formed concurrently with the fastener member.

SUMMARY OF THE INVENTION

According to the present invention there is provided a method of making a fastener member having a base and a plurality of arranged stems each having a proximal end projecting from the base and a distal end having a head. The method includes the steps of (a) providing a base mold having a cavity adapted to mold the base of the fastener; (b) providing a sacrificial stem mold having a plurality of arranged passageways for molding the stems; (c) providing a head mold having a plurality of arranged cavities for molding the heads; (d) securing the sacrificial stem mold adjacent the base mold with the passageways of the stem mold in fluidic communication with the base mold cavity, and securing the head mold adjacent the sacrificial stem mold with the head mold cavities in fluidic communication with the passageways of the sacrificial stem mold; (e) flowing a molten plastic into the molds through the inlet passageway in one of the base mold, the sacrificial stem mold, and the head mold to form the base, stems, and heads of the fastener member; (f) solidifying the plastic within the molds to form the fastener member; (g) separating the head mold and the base mold from the sacrificial stem mold and the solidified fastener member; and (h) removing the sacrificial mold to release the fastener member from the sacrificial mold without damage to the fastener member. In one embodiment, the method described above includes the step of removing the sacrificial mold by dissolving the mold with a solvent, such as hot water. The invention also includes the fastener made by the described method.

Also provided is a mold for making a unitary plastic fastener member comprising a base and a plurality of stems arranged in columns and rows, each stem having a proximal end projecting from the base and a distal end having a head. The mold includes (a) a base mold having a cavity adapted to mold the base of the fastener; (b) a sacrificial stem mold adjacent the base mold and having a plurality of passageways arranged in columns and rows and in fluidic communication with the base mold cavity to mold the stems atop and projecting from the base; and (c) a head mold having a plurality of cavities arranged in columns and rows and in fluidic communication with the sacrificial stem mold passageways, the head mold cavities adapted to mold the heads of the fastener member, the head mold having an inlet passageway communicating at least one of the cavities with an outer wall of the head mold and adapted for transfer of a molten plastic material to the at least one cavity to form the fastener member. The base mold and head mold are adapted for separation from the sacrificial stem mold and plastic fastener member to enable release of the fastener member from the sacrificial stem mold without damage thereto. In one embodiment, the sacrificial mold is made of a thermoplastic containing a COOH group that is soluble in an aqueous media.

BRIEF DESCRIPTION OF THE DRAWINGS

The invention will be more readily understood with reference to the accompanying drawings, wherein like reference numerals refer to like components throughout the several views, and wherein.

DETAILED DESCRIPTION

A method is disclosed of forming a fastener member having a base, a plurality of stems atop the base and projecting therefrom, and a plurality of heads connected to distal ends of the stems. The method, which will be described in detail below, generally involves forming a sacrificial stem mold, securing the sacrificial stem mold between a base mold and a head mold, injecting molten or liquid material to form the fastener, separating the base and head molds from the sacrificial stem mold to expose the fastener, and removing the sacrificial stem mold to release the fastener. The method of the present invention will be better understood with reference to FIGS. 4 through 8, which generally illustrate succeeding steps in the method.

Figure 4:
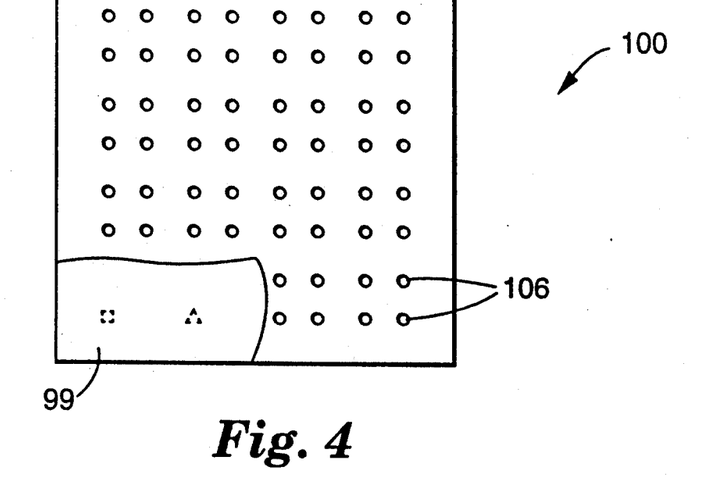
FIG. 4 is a plan view of a sacrificial stem mold according to one embodiment of the present invention.

As shown in FIG. 4, a sacrificial stem mold 100 is formed including a plurality of arranged passageways 106 corresponding to the desired shape and location of the stems of the finished fastener member. In the illustrated embodiment, the passageways are shown in cross section as being circular, but could also have a different cross-sectional profile (e.g. square or triangular, as shown generally at 99 in FIG. 4). Similarly, the sacrificial stem mold 100 could include passageways of two or more cross-sectional configurations within that mold (e.g. alternating rows of circular and square cross-sectional passageways, or alternating circular and square cross-sectional passageways within each row).

Figure 10:
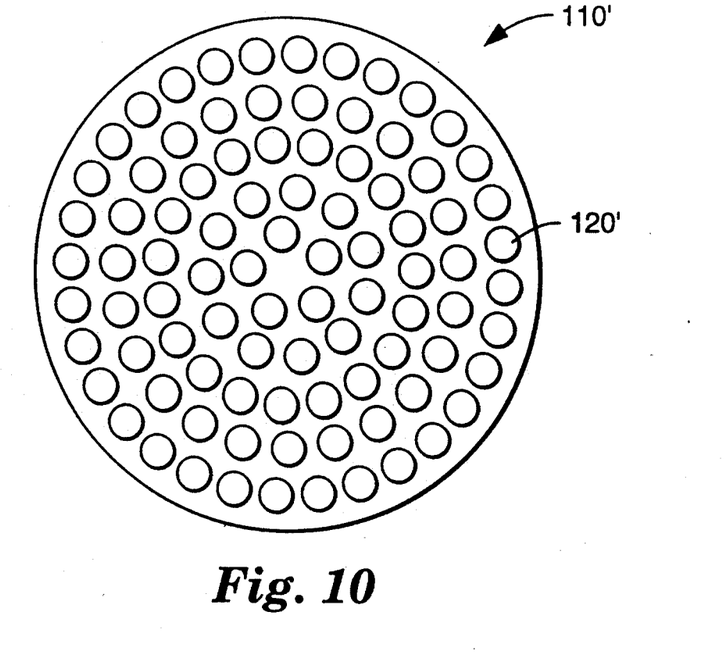
FIG. 10 is a plan view of one embodiment of a fastener according to the present invention.

The passageways may be regularly arranged in columns and rows, or may be formed in any other desired arrangement. For example, a generally circular connector 110' may be formed, including stems (not shown)

and head portions 120' arranged in a pattern comprising a plurality of concentric rings, as shown in FIG. 10. It is preferred that the passageways of the sacrificial stem mold be arranged such that adjacent passageways are slightly separated from each other. As shown in FIGS. 1, 2, and 4 through 8, a slight separation between each pair of rows of stems facilitates interengagement when opposed fastener members are fastened together, as shown in FIG. 2, because the respective stems and attached heads are able to deflect into the space separating adjacent pairs of rows when the respective heads contact each other. The proper spacing of each respective row of stems depends on several factors, including but not limited to the material from which the fastener members are made, the size of the stems and heads, the intended use, and the desired disengagement force.

Figure 13:
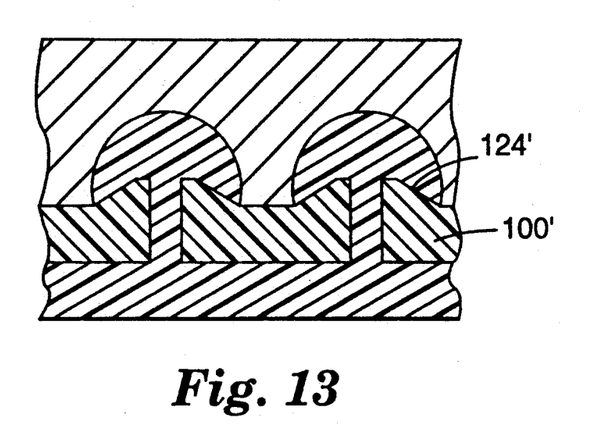
FIGS. 13 and 14 are sectional views through a sacrificial stem mold, stem, and head of fastener members formed according to an embodiment of the present invention.
Figure 14:
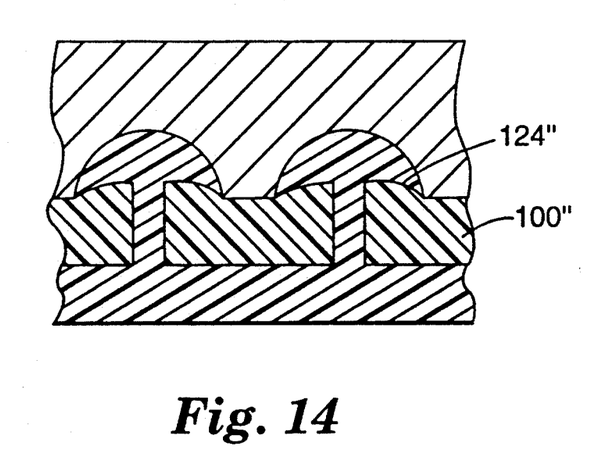

Sacrificial stem mold 100 is generally planar, which permits the formation of head portions having generally planar latching portions. In other embodiments, shown in FIGS. 13 and 14, the sacrificial stem mold 100' and 100" may be adapted to form a configured latching surfaces 124' and 124", respectively, in order to alter the force necessary to disengage interconnected fastener members. Thus planar latching surfaces and configured latching surfaces provided by suitable modifications of the sacrificial stem mold are within the scope of the present invention.

The sacrificial stem mold is designed to be durable enough to withstand the injection molding process used to form the fastener member, and to be removed after the fastener member has been formed to release the fastener. The fastener may be "removed" from the sacrificial mold by many different methods, including dissolving the mold with a solvent (e.g. water, acetone, or alcohol), disintegrating, melting, shattering (e.g. by force or ultrasonic wave transmission), cutting, or otherwise destructively removing the sacrificial stem mold from around the stems without damaging the fastener member.

In the preferred embodiment, the sacrificial stem mold material (hereinafter "stem mold material") is a water soluble material. This allows the sacrificial mold to be removed from the fastener by applying water to the mold and agitating or vibrating the mold (e.g. by ultrasonic or mechanical vibration) to dissolve the mold. For example, the materials disclosed in European Patent Application No. 0,314,156 (Delbig), which is hereby incorporated by reference, pertain to thermoplastic mixtures of fillers and polymers containing COOH groups, which are soluble in aqueous or aqueous-alkaline media. Such mixtures can be thermoplastically formed into solid parts, which can be dissolved after use. An example of such a material that may be suitable for certain applications is available from the Belland Ag. of Switzerland under the designation GBC-1330. Further examples of materials that may be useful in forming the sacrificial stem mold of the present invention are disclosed in U.S. Pat. Nos. 4,990,146 (Delbig et al.), which discloses an amino-group containing polymer that is soluble in an acid medium, and 4,870,148 (Belz et al.) which discloses polymers that are soluble in an alkaline medium. Yet another resin that may have applicability to the sacrificial stem mold comprises approximately 70% polyvinylalcohol, 30% talc and a trace of glycerine, and is available from Riken Vinyl Industry Co., Ltd., of Tokyo, Japan. Other combinations of sacrificial stem mold material and solvent are considered to be within the scope of the present invention, as is any other sacrificial stem mold material that may be removed as previously described.

The sacrificial stem mold is typically formed by injection molding, which is well known in the art, as shown in 8 *Encyclopedia of Polymer Science and Engineering* 102–34 (Wiley 1987), the disclosure of which is hereby incorporated by reference. Injection molding generally involves providing a die having a cavity, which cavity is connected to the outside of the die by an inlet passageway. The die is usually split into at least two parts, allowing the die parts to be separated to remove an article formed therein. Molten material is flowed into the die cavity through the inlet passageway, where the material solidifies to form an article that is shaped by the contours of the cavity. When the material has solidified, the die is removed to expose the finished article. Although the process has been described only summarily, injection molding is known in the art, and therefore only portions of the process and equipment will be shown and described herein. Other methods of forming a sacrificial stem mold, such as pouring the stem mold material into an open face mold or forming holes in a stem mold sheet member, are also included within the scope of the present invention.

Figure 5:
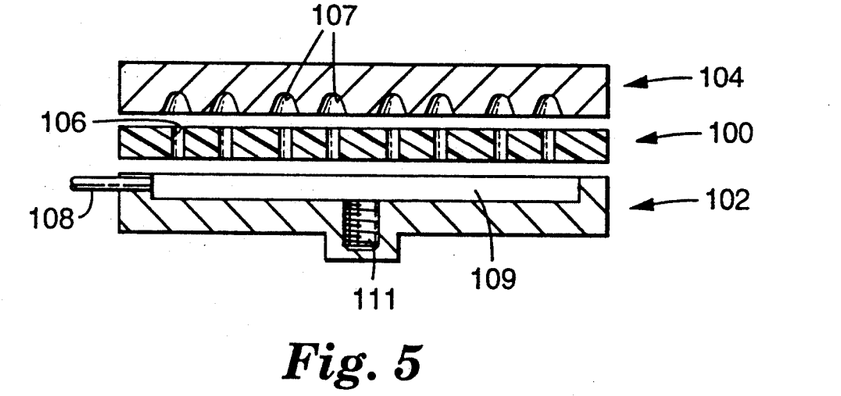
FIG. 5 is a sectional view of a head mold, a stem mold and a base mold prior to injection molding of the fastener member of the present invention.
Figure 6:
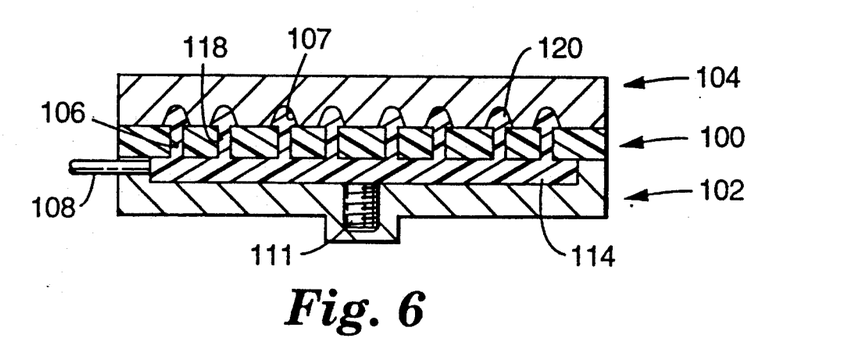
FIG. 6 is a sectional view of a head mold, sacrificial stem mold and a base mold following injection molding of the fastener member of the present invention.

After the sacrificial stem mold 100 has been formed, it is placed between a base mold 102 and a head mold 104 in preparation for injection molding the fastener member of the present invention, as shown in FIG. 5. Base mold 102 and head mold 104 are both permanent molds, meaning that they are not intended to be broken or destroyed to release the fastener. In general, base mold 102, sacrificial stem mold 100 and head mold 104 are positioned with the cavities of each mold positioned in fluidic communication with the corresponding cavities of the adjacent mold, as shown in FIG. 6, in order to form the fastener member of the present invention.

Figure 11:
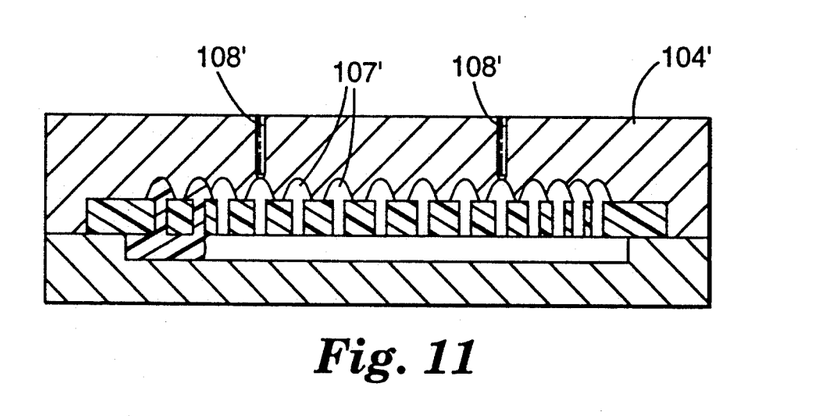
FIGS. 11 and 12 are sectional views of different embodiments of a mold according to the present invention.
Figure 12:
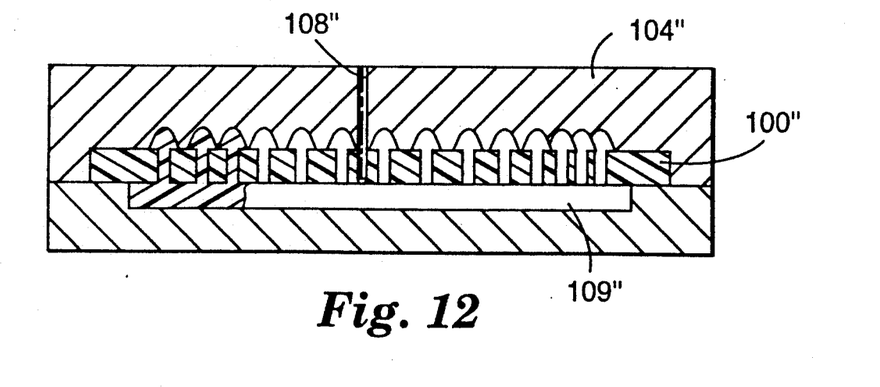

Base mold 102 includes an inlet passageway 108 that communicates with cavity 109, as shown in FIG. 5. Inlet passageway 108 may enter from any side or the bottom of base mold 102, and is adapted to permit transfer of the molten material from a source of such material into cavity 109. It may be desirable for inlet passageway to be generally fan-shaped, in order to spread the flow of molten material more evenly within cavity 109. In the illustrated embodiment, inlet passageway 108 enters cavity 109 from a side of base mold 102, as shown in FIG. 5. Alternatively, inlet passageways 108' may be formed in head mold 104', whereby inlet passageway 108' is fluidically connected to one or more head cavities 107', as shown in FIG. 11. In yet another embodiment, inlet passageway 108" enters through head mold 104" and sacrificial stem mold 100" to fluidically communicate with cavity 109", as shown in FIG. 12.

Cavity 109 is shaped to form the base of the fastener member, which may be of various different dimensions depending on the application. In the illustrated embodiment, cavity 109 is adapted to form a flat base having a width that is greater than its thickness, but other embodiments are also possible, such as a base mold 102 that is much larger than the stem and head portions formed thereon. For example, a large panel (e.g. an automotive body panel or trim component) could be formed within base mold 102, with one or more groupings of arranged stem and head portions projecting therefrom. Thus the base mold, although shown as relatively small with respect to the head and stem molds, should be understood to include base molds adapted to form base portions that are much larger and more detailed than those illustrated herein.

Alternatively, base mold 102 may be dimensioned to provide a secondary fastening portion, shown in FIGS. 5-8 as screw thread 111, adjoining base 114, which enables attachment of fastener member 110 to a body, surface, or the like. Inlet passageway 108 could also be adapted to form such a secondary fastening portion. It is a further advantage of the preferred method of injection molding the fastener member of the present invention that the secondary fastening portion may be injection molded simultaneously with the remainder of the fastener member. The method of the prior art described above typically involves a second manufacturing step to weld a secondary fastening portion to the fastener member, either using a solvent, heat or ultrasonic horn, each of which is more complicated and therefore more expensive than the integrated method of the present invention.

Figure 8:
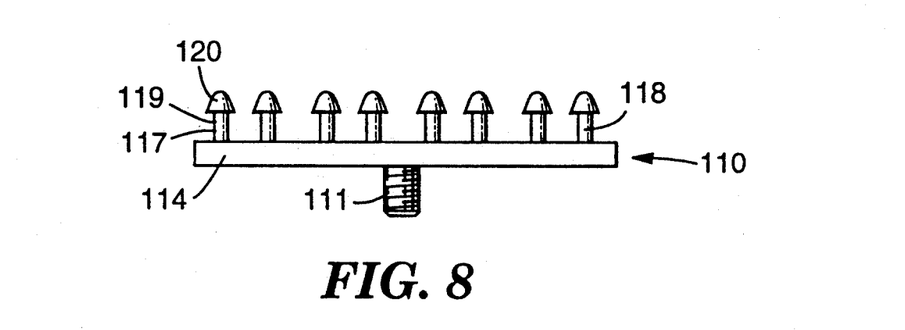
FIG. 8 is a sectional view of the fastener member of the present invention after the sacrificial stem mold has been removed from the fastener member.

Sacrificial stem mold 100 is positioned atop base mold 102 such that molten material will fill cavity 109 to form the base, and flow into passageways 106 to form stems 118 and into head cavities 107 of head mold 104 to form heads 120, as described below. After molten material is injected to form the fastener, each of stems 118 will have a proximal end 117 that is anchored to base 114, and a distal end 119 that projects from base 114, as shown in FIG. 8.

Figure 9:
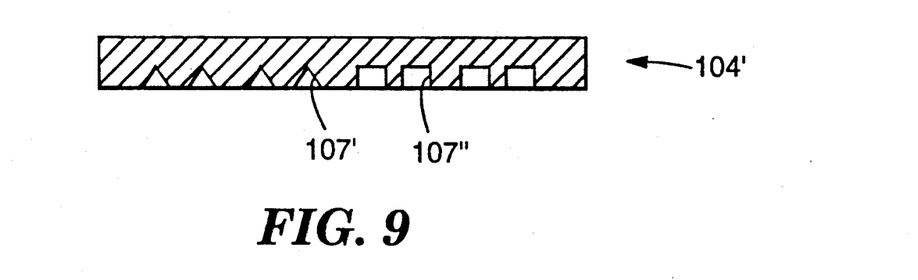
FIG. 9 is a sectional view of a head mold according to one embodiment of the present invention.

As shown in FIG. 5, head mold 104 is positioned atop sacrificial stem mold 100, and includes a plurality of arranged head cavities 107 that are adapted to mold heads 120 atop the respective distal ends 119 of the stems. Head cavities 107 are in fluidic communication with the respective passageways 106 that form stems 118, in order that molten material flow through passageways 106 to form heads 120. Head cavities 107 may be formed in one of many different shapes, including head cavities that are conical, hemispherical, cylindrical, cubic, spherical or the like. For example, FIG. 9 shows head cavities that are generally conical (107') and generally cubic (107"). In the embodiment illustrated in FIGS. 1, 2, and 4-8, head cavities 107 are shown as a mushroom shape.

The following non-limiting example of a fastener member designed and formed according to the present invention is provided to illustrate the relative dimensions of the fastener member, and therefore of the base mold cavity, the sacrificial stem mold passageways, and the head mold cavities. The fastener member includes a base layer measuring approximately 0.15 cm. (0.06") thick, a plurality of cylindrical stems measuring 0.08 cm. (0.03") in diameter and 0.18 cm. (0.07") high, and a plurality of generally conical heads having a base diameter measuring approximately 0.165 cm. (0.065") and a height of approximately 0.13 cm. (0.05"). The stems are arranged in sets of rows, such that the two rows of each pair of rows are separated by approximately 0.2 cm. (0.08") on center, and that each pair of rows is separated from each adjacent pair of rows by approximately 0.24 cm. (0.093") on center. It should be noted that widely spaced stems having small heads will tend to require smaller engagement and disengagement forces, whereas closely spaced stems having large heads will require larger engagement and disengagement forces.

After base mold 102, sacrificial stem mold 100 and head mold 104 have been properly aligned and secured together in a manner known in the art, a suitable molten plastic material may be injected through inlet passageway 108 to form fastener member 110, as shown in FIG. 6. As used herein, "plastic" includes all monomers, polymers, and oligomers and mixtures thereof. Injection molding is preferred manner of forming the fastener member of the present invention, because resins with higher melting points may be used to form the fastener member when it is injection molded than when the stems must be heated to form heads atop individual monofilaments according to the prior art. For example, polypropylene may be used to form fastener members by the prior art method of heating the monofilament stems, because it has a relatively low melting point and the ends of the stems are more easily heated to form the heads. Resins such as nylon, however, may be less desirable for the prior art method because nylon has a higher melting temperature, and it may therefore be more difficult to control the formation of a head atop a monofilament by heating. With the method of the present invention, nylon (and other materials that have relatively high melting points) may be used to form the fastener member by injection molding, which may produce a stronger fastener.

Alternatively, a process known as reaction-injection molding (RIM) has also been shown to have utility, and generally involves supplying and mixing the proper reactive liquid components and injecting them into a mold where the mixture is polymerized to form a plastic article. Materials such as polyurethane, polyester and nylon may be reaction-injection molded in accordance with the present invention.

The type of material selected to form the fastener member (hereinafter "fastener material") depends upon the application, and materials such as polypropylene (e.g. product No. 8826J available from Mitsubishi-kasai) polyacetal (e.g. product No. M90-44 available from Polyplastic), nylon (e.g. product No. 1554 available from Mitusi DuPont Chemical), and thermocurable plastics such as phenolic resins and polyurethane resins have been shown to have utility. The fastener material should not chemically interact with the stem mold material or otherwise detrimentally affect the structure or performance of the sacrificial stem mold. Furthermore, as noted above, the stem mold material should be resistant to the injection molding process used to form the fastener member.

The following data illustrate several nonlimiting sample parameters of the molding step of the present invention.

|  | Stem Mold | Polypropylene | Polyacetal | Ionomer | Nylon 66 |
| --- | --- | --- | --- | --- | --- |
| Resin Temp. | 190° C. | 190° C. | 160° C. | 190° C. | 260° C. |
| Max. Press. | 1200 kg/cm$^2$ | 1200 kg/cm$^2$ | 1200 kg/cm$^2$ | 1200 kg/cm$^2$ | 1200 kg/cm$^2$ |
| Molding Time | 30 sec | 30 sec | 25 sec | 30 sec | 30 sec |
| Cooling Time | 15 sec | 15 sec | 10 sec | 15 sec | 15 sec |

These samples were run on an Auto Shot C series Model 30A injection molding machine available from Fanuc Co. Ltd. of Tokyo, Japan. The resin was injected into the mold at a flow rate of 10-50 mm/second, and the pressure was limited to a maximum of 1200 kg/cm$^2$. The mold locking force was approximately 30 tons.

The newly formed fastener is typically allowed to harden while within the base, stem and head molds.

Figure 7:
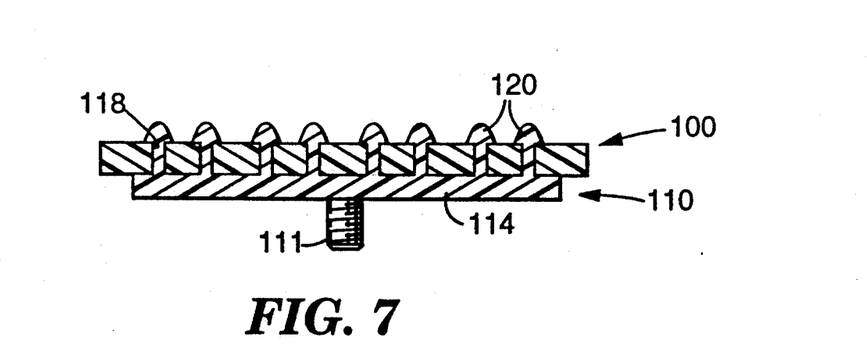
FIG. 7 is a sectional view of the fastener member of the present invention with the sacrificial stem mold attached to the stems of the fastener following injection molding of the fastener.

Under some circumstances, the fastener material may cure more quickly or effectively if heat is applied. Base mold 102 and head mold 104 are removed when fastener member 110 has hardened, which leaves sacrificial stem mold 100 attached to the stems of the fastener member, as shown in FIG. 7. Sacrificial stem mold 100 is then removed to release fastener member 110 from the stem mold, as illustrated in FIG. 8. In the preferred embodiment, the sacrificial stem mold is removed by the application of a solvent, preferably water, to the sacrificial mold material to dissolve the sacrificial mold. In the most preferred embodiment, the sacrificial stem mold is removed by dissolving it with hot water. Mechanical or ultrasonic vibration, preferably in combination with a solvent, but perhaps without the solvent, may expedite the removal of sacrificial stem mold from fastener 110.

To engage opposed fastener members, which may be formed by dividing a single fastener member into two parts, the fastener members are aligned as shown with respect to the prior art in FIG. 1. Compressive force applied to the respective bases tends to interengage the fastener members, as shown in FIG. 2 with respect to the prior art. As explained previously, the level of force necessary to engage and disengage the fastener members can be controlled by altering the dimensions and spacing of the stems and heads.

It is believed that, for certain geometries, the force required to disengage the fastener members constructed according to the present invention may be much greater (e.g. two times greater) than that required to separate comparable fasteners constructed according to the method of the prior art. Thus the present invention provides greater control over the formation of the shape of the heads, resulting in a fastener that exhibits greater holding power. It is further believed that the force required to engage the fastener member of the present invention may be higher than the force required to engage comparable fastener members formed according to the method of the prior art, although it is believed that such engagement forces may be controlled by varying the head shape, stem spacing and resin modulus.

The present invention has now been described with reference to several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures.

We claim:

1. A method of making a fastener member comprising a base and a plurality of arranged stems each having a proximal end projecting from the base and a distal end having a head, the method comprising the steps
   (a) providing a permanent base mold having a cavity adapted to mold the base of the fastener;
   (b) providing a sacrificial stem mold having a plurality of arranged passageways for molding the stems;
   (c) providing a permanent head mold having a plurality of arranged cavities for molding the heads;
   (d) securing the sacrificial stem mold adjacent the base mold with the passageways of the stem mold in fluidic communication with the base mold cavity, and securing the head mold adjacent the sacrificial stem mold with the head mold cavities in fluidic communication with the passageways of the sacrificial stem mold;
   (e) flowing a molten plastic into the molds through an inlet passageway in one of the base mold, the sacrificial stem mold, and the head mold to form the base, stems, and heads of the fastener member;
   (f) solidifying the plastic within the molds to form the fastener member;
   (g) separating the head mold and the base mold from the sacrificial stem mold and the solidified fastener member; and
   (h) destructively removing the sacrificial mold to release the fastener member from the sacrificial mold without damage to the fastener member.

2. The method of claim 1, wherein step (h) includes destructively removing the sacrificial mold by dissolving the mold with a solvent.

3. The method of claim 1, wherein step (h) includes destructively removing the sacrificial mold by providing a heated solvent and dissolving the mold with the heated solvent.

4. The method of claim 2, wherein the solvent comprises water.

5. The method of claim 3, wherein the solvent comprises water.

6. The method of claim 2, wherein step (h) includes destructively removing the sacrificial mold by dissolving the mold with a solvent and agitating the mold.

7. The method of claim 1, wherein step (e) includes the step of injection molding the fastener member.

8. The method of claim 1, wherein step (e) includes the step of reaction-injection molding the fastener member.

* * * * *

UNITED STATES PATENT AND TRADEMARK OFFICE
CERTIFICATE OF CORRECTION

PATENT NO. : 5,242,646
DATED : September 7, 1993
INVENTOR(S) : Shinji Torigoe, Jiro Hattori, and Akimitsu Takagi It is certified that error appears in the above-indentified patent and that said Letters Patent is hereby corrected as shown below:

Col. 7, line 50, there should be no indentation at this line.

Col. 10, line 7, after "steps" insert --of:--.

Signed and Sealed this

Eighteenth Day of October, 1994

Attest:

BRUCE LEHMAN

*Attesting Officer*  *Commissioner of Patents and Trademarks*